United States Patent [19]
Metcalf et al.

(10) Patent No.: US 6,539,282 B2
(45) Date of Patent: Mar. 25, 2003

(54) VENDING MACHINE FOR VENDING AGE-RESTRICTED PRODUCTS USING A CREDIT CARD AND ASSOCIATED METHODS

(75) Inventors: Jonathan H. Metcalf, Houston, TX (US); Robert J. O'Leary, Cypress, TX (US); Merlyn W. Barth, St. Louis, MO (US)

(73) Assignee: The Detsky Group, L.P., Cypress, TX (US)

(*) Notice: Subject to any disclaimer, the term of this patent is extended or adjusted under 35 U.S.C. 154(b) by 50 days.

(21) Appl. No.: 09/851,198

(22) Filed: May 8, 2001

(65) Prior Publication Data

US 2002/0029196 A1 Mar. 7, 2002

Related U.S. Application Data

(60) Provisional application No. 60/202,432, filed on May 8, 2000.

(51) Int. Cl.⁷ .............................................. G06F 17/00
(52) U.S. Cl. ................... 700/237; 700/236; 700/231; 700/242; 700/244
(58) Field of Search ................... 700/237, 236; 235/380

(56) References Cited

U.S. PATENT DOCUMENTS

| | | | |
|---|---|---|---|
| 4,230,214 A | 10/1980 | Cortez | 194/59 |
| 4,650,977 A | 3/1987 | Couch | 235/379 |
| 4,884,212 A | 11/1989 | Stutsman | 364/479 |
| 4,915,205 A | 4/1990 | Reid et al. | 194/205 |
| 4,982,072 A | 1/1991 | Takigami | 235/384 |
| 4,995,081 A | 2/1991 | Leighton et al. | 380/23 |
| 5,042,686 A | 8/1991 | Stucki | 221/13 |
| 5,091,713 A | 2/1992 | Horne et al. | 340/541 |
| 5,139,384 A | 8/1992 | Tuttobene | 414/281 |
| 5,146,067 A | 9/1992 | Sloan et al. | 235/381 |
| 5,147,021 A | 9/1992 | Maruyama et al. | 194/217 |
| 5,273,183 A | 12/1993 | Tuttobene | 221/7 |
| 5,352,876 A | 10/1994 | Watanabe et al. | 235/381 |
| 5,371,346 A | 12/1994 | Menoud | 235/381 |

(List continued on next page.)

FOREIGN PATENT DOCUMENTS

| | | | |
|---|---|---|---|
| JP | 6 236477 | | 2/1993 |
| JP | 8 241455 | | 3/1995 |
| WO | WO98/04969 | * | 2/1998 |
| WO | WO 99/09508 | | 2/1999 |

OTHER PUBLICATIONS

International Search Report for PCT Application No. PCT/US01/12600 (previously cited in Supplemental IDS communication to the PTO, dated Aug. 27, 2001).
International Search Report for PCT Application No. PCT/US01/40694 dated Oct. 30, 2001.

Primary Examiner—Donald P. Walsh
Assistant Examiner—Michael E. Butler
(74) Attorney, Agent, or Firm—Howrey Simon Arnold & White, LLP

(57) ABSTRACT

An improved vending machine for vending age-restricted products is disclosed. The vending machine preferably uses a customer's credit card to obtain age verification information from a consumer reporting agency via a modem. In a preferred embodiment, a customer inputs customer information, preferably a credit card number, into the vending machine. The vending machine obtains permission from the customer to use the customer information to retrieve the customer's age. Thereafter, the age data is either retrieved from a server farm containing the age of the customer corresponding to the credit card, or is retrieved via modem from the database of a consumer reporting agency. Additionally, the modem connection allows the creditworthiness of the credit card to be checked via access to a credit card company database. If the age and credit card of the customer can be verified in this fashion, the vending machine then vends the product to the customer.

20 Claims, 4 Drawing Sheets

U.S. PATENT DOCUMENTS

| | | |
|---|---|---|
| 5,450,980 A | 9/1995 | Laidlaw .......................... 221/1 |
| 5,523,551 A | 6/1996 | Scott ........................... 235/381 |
| 5,553,119 A | 9/1996 | McAllister et al. ............ 379/67 |
| 5,586,171 A | 12/1996 | McAllister et al. ............ 379/67 |
| 5,641,050 A | 6/1997 | Smith et al. .................. 194/210 |
| 5,641,092 A | 6/1997 | Scott ........................... 221/134 |
| 5,647,505 A | 7/1997 | Scott .............................. 221/2 |
| 5,696,908 A | 12/1997 | Meuhlberger et al. ....... 395/239 |
| 5,722,526 A | 3/1998 | Sharrard ..................... 194/346 |
| 5,734,150 A | 3/1998 | Brown et al. ................ 235/381 |
| 5,774,365 A | 6/1998 | Ladue et al. ............ 364/479.07 |
| 5,819,981 A | 10/1998 | Cox ................................ 221/2 |
| 5,859,779 A | 1/1999 | Giordano et al. ....... 364/479.01 |
| 5,927,544 A | 7/1999 | Kanoh et al. .................. 221/90 |
| 5,988,346 A | 11/1999 | Tedesco et al. ............. 194/217 |
| 6,052,629 A | 4/2000 | Leatherman et al. ........ 700/241 |
| 6,072,902 A | 6/2000 | Myers ......................... 382/167 |
| 6,078,902 A | 6/2000 | Schenkler ..................... 705/35 |
| 6,085,976 A | 7/2000 | Sehr ........................... 235/384 |
| 6,109,524 A | 8/2000 | Kanoh et al. ................ 235/381 |
| 6,119,932 A * | 9/2000 | Malony et al. ............. 235/380 |

* cited by examiner

VENDING MACHINE FOR VENDING AGE-RESTRICTED PRODUCTS USING A CREDIT CARD AND ASSOCIATED METHODS

CROSS-REFERENCE TO RELATED APPLICATION

This application claims priority under 35 U.S.C. § 119(e) to provisional patent application Ser. No. 60/202,432, entitled "Method and System of Age Verification For a Vending Machine," filed on May 8, 2000.

BACKGROUND OF THE INVENTION

The present invention relates generally to a vending machine for vending age-restricted products, and specifically to a vending machine that preferably uses a customer's credit card to obtain age verification information from a consumer reporting agency for allowing or disallowing point-of-purchase transactions.

Most, if not all, states impose minimum age requirements for the purchase of certain products such as alcohol, tobacco products, and other age-restricted products. In order to purchase such products, the customer traditionally must present identification to the seller to verify his or her age prior to the transaction. The inability to verify the customer's age prevents age-restricted products from being sold in vending machines. This verification process is particularly problematic in the vending machine industry since vending machines, by their very nature, involve unattended point-of-purchase transactions. Some examples of prior approaches to this problem or related problems can be found in the following U.S. patents, all of which are incorporated herein by reference in their entirety: U.S. Pat. Nos. 4,884,212; 5,139,384; 5,146,067, 5,273,183; 5,352,876; 5,371,346; 5,450,980; 5,523,551; 5,641,050; 5,641,092; 5,647,505; 5,696,908; 5,722,526; 5,734,150; 5,774,365; 5,819,981; 5,859,779; 5,927,544; 5,988,346; 5,147,021; 4,982,072; 4,915,205; and 4,230,214.

Some prior art vending approaches, such as that of Sharrard, U.S. Pat. No. 5,722,526, have contemplated using drivers licenses or other identification cards to verify the customer's age. In the Sharrard system, a customer inputs money into the vending machine and makes his or her selection. Thereafter, the customer is prompted to input an identification card such as a state government issued identification card or a drivers license containing the customer's birth date. The vending machine either optically reads and interprets the written birth date on the face of the card, or reads the birth date data from a magnetic strip contained on the back of the card. A processor unit compares this data with the present date that is keyed into the vending machine by its operator, and determines whether the customer is of a sufficient age to purchase the product.

However, common forms of identification often do not have data written or encoded on them indicative of the user's age or birth date. Moreover, some forms of identification may not have magnetic strips, such as drivers licenses which may or may not have a magnetic strip depending on the state at issue. Finally, it is not a simple matter to optically read and interpret written birth date data, a process that involves complicated scanning and data-interpretation technology. These shortcoming render the Sharrard approach difficult to commercialize.

Some prior art approaches such as U.S. Pat. No. 5,927,544, issued to Kanoh, suggests that age information can be "recorded on the [credit] card" to verify a vending customer's age for the purpose of vending age-restricted products, see Kanoh, Col. 4, ll. 55–58, but the present inventors submit that such information is in fact rarely present on a standard credit card. Although consumer reporting agencies, such as TRW and Equifax, and other credit card companies such as VISA or MasterCard, store information in databases, for a large number of consumers, conventional vending machines are unable to access such information to verify the age of a purchaser. Those prior art vending machines that have connectivity to such databases contemplate using the database to verify credit or password information, but do not disclose or suggest using such databases to verify age. See Kanoh, Col. 4, ll. 37–42 (noting that the microprocessor in his vending machine enables "a credit card company to check credit card numbers, personal identification code numbers, and other data via a communications link," but not mentioning age data).

SUMMARY OF THE INVENTION

The invention meets the above needs and overcomes the deficiencies of the prior art by providing an improved vending machine that preferably uses a customer's credit card to obtain age verification information from a consumer reporting agency to allow or disallow the purchase of an age-restricted product. Briefly described, in a preferred embodiment, a customer first inputs customer information, preferably a credit card number, into the vending machine. The vending machine next obtains permission from the customer to use the customer information to retrieve the customer's age. If permission is granted, the age data is either retrieved from a server farm containing the age of the customer corresponding to the credit card, or is retrieved via modem from a third party database, such as a consumer reporting agency database. Additionally, the modem connection allows the creditworthiness of the credit card to be checked via access to a credit card company database. If the age and credit card of the customer can be verified in this fashion, the vending machine then vends the age-restricted product to the customer.

DETAILED DESCRIPTION OF PREFERRED EMBODIMENTS

In the disclosure that follows, in the interest of clarity, not all features of actual implementations are described. It will of course be appreciated that in the development of any such actual implementation, as in any such project, numerous engineering and design decisions must be made to achieve the developers' specific goals and subgoals (e.g., compliance with mechanical- and business-related constraints), which will vary from one implementation to another. Moreover, attention will necessarily be paid to proper engineering and design practices for the environment in question. It will be appreciated that such a development effort might be complex and time-consuming, but would nevertheless be a routine undertaking for those of skill in the art.

Generally speaking, the vending machine of the invention verifies the age of a customer prior to allowing the customer to purchase an age-restricted product. The vending machine uses customer information, e.g., a customer's credit card number. This information is sent by the vending machine to database containing consumer information and data indicative of the customer's age. Once the customer age's is retrieved using the customer information, that age is then used to enable or disallow the transaction.

Figure 1A:
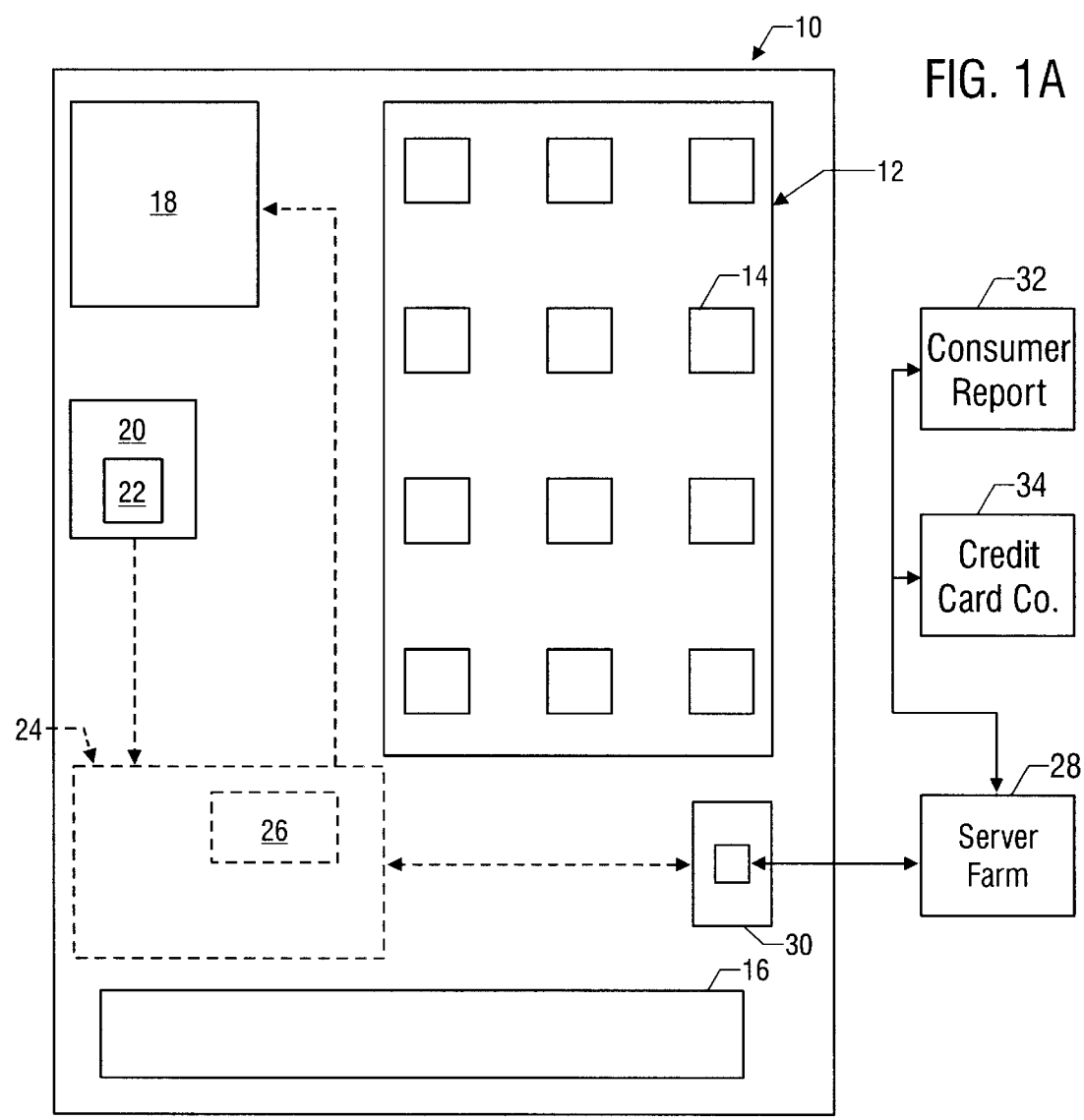
FIG. 1A is a block diagram illustrating a vending machine according to a preferred embodiment of the present invention.

FIG. 1A shows a block diagram of the basic components of a preferred embodiment of the vending machine 10 of the invention. As in a traditional vending machine, vending machine 10 includes a product viewing area 12 for displaying age-restricted products 14 for sale, and a product dispensing door 16. Also present is a display 18, which is preferably a liquid crystal display, but could also be a cathode ray tube, an alpha-numeric display; or various indicator lights. Input device 20 generally comprises all means used for inputting information into the vending machine. For example, input device 20 could constitute a key pad (not shown) for choosing one of the products 14 to be vended, or for choosing various options presented on display 18.

Input device 20 includes, preferably, a card reader 22 capable of reading either the magnetic strip on the back of a customer's credit card, or the contents of integrated circuits contained on a "smart card." As used in this disclosure and in the claims, "credit card" should be interpreted to include standard credit cards, "smart cards" containing integrated circuits such as Flash EPROM memory, store-issued customer cards, debit cards, value added cards, or similar cards or means used to establish electronic credit. Likewise, a "card reader" should be interpreted as any device suitable for reading the electronic information from such "credit, cards." The customer's credit card encodes what this disclosure refers to as "customer information." Typically, customer information preferably constitutes the customer's credit card number, although other identifying information may also utilized, such as a name, phone number, social security number, birth date, address, a password or code, etc.

Other standard features of a vending machine, such as a money input slot, may be present on vending machine 10, but would be unnecessary if (as is preferably contemplated), payment for the purchase is to be made by credit card.

Included within vending machine 10 is a control unit 24, which in turn includes a microprocessor 26. Microprocessors such as microprocessor 26 are relatively standard in modern day vending machines, and can constitute a variety of different products, such as microcontrollers, programmable logic arrays (PLAs), or other suitably sophisticated logic circuits capable of handling and controlling the various signals within the vending machine 10.

As in a traditional computer-controlled vending machine, the control unit 24 receives information from the input device 20 (including card reader 22) and sends graphical information to display 18. More significantly to the present invention is the control unit 24's connection to a modem 30 on the vending machine 10. The modem 30 allows the vending machine 10 to communicate with a server farm 28, and ultimately with third-party databases, such as consumer reporting agency databases 32, and credit card company databases 34. Many different communication devices can be used in place of modem 30, including antennas for wireless communication to the server farm 28, optical transmission devices using fiber optic cables, etc. "Communication devices" should be construed in both this disclosure and claims to include these and any other means of sending communication signals to the server farm 28 or the other third-party databases.

In a preferred embodiment, and using the customer information, the consumer reporting agency database 32 may be queried by the vending machine 10 to determine the customer's age, while the credit card company database 34 may be queried to verify that customer's credit card is valid and contains sufficient credit to make a purchase. Alternatively, if the customer's age is retrievable from the credit card company database 34, it may so be retrieved, thereby eliminating the need to query the consumer agency database 32.

Generally speaking, server farm 28 keeps track of the various transactions within a vending machine 10 and the various customers that have used the vending machine. More specifically, it includes a database with suitable routing control to communicate with the vending machine 10 and the third party databases 32 and 34. Although shown in FIG. 1B as being connected to a single vending machine, it is contemplated that in a commercial setting that server farm 28 would be connected to numerous vending machines 10, perhaps even on a state-wide, nation-wide, or global scale. Depending on the complexity of the vending machine network, server farm 28 could constitute a personal computer, a server, a mainframe, a supercomputer, or a network of any of these. The database portion of server farm 28 is preferably a hard magnetic disk, but may also constitute random access memory if provisions are made in the server farm 28 for a battery back up to ensure that information in the server farm 28 is preserved if power is lost. In a commercial embodiment, it is contemplated that the server farm 28 reside outside of the vending machines 10 with which it is in communication, and in fact may reside hundreds of miles away from such machines.

As noted above, server farm 28 collects information concerning the transactions completed on the vending machines 10 to which it is connected, such as the products purchased, by whom (in accordance with knowledge of the customer information), and the age of the customer. Some of this information comes from the card itself, or from the vending machine 10, while other information comes externally from third party databases 32 and 34. Either way, a database of information builds up within the vending machine in server farm 28. Collecting such information can be useful for a number of reasons. For example, the information stored in server farm 28 can be used to inform a vending machine operator that a particular product 14 is near empty in the machine. The information may also be useful to sell to third parties, to the extent permitted by law, that are interested in marketing certain other products to the purchasers of the products in the vending machine.

Of particular importance to the present disclosure however is the storage of a particular customer's age in server farm 28. As will be explained shortly, when a customer first makes a credit card purchase from vending machine 10, the vending machine 10, via server farm 28, will preferably send the customer information (e.g., the customer's credit card number) to consumer reporting agency database 32 and to credit card company database 34. Sending customer information to credit card company 34 is done primarily for obtaining information on the creditworthiness of the customer, and in particular on the specific credit card utilized. On the other hand, the consumer reporting agency 32 will report the customer's age. (Of course, the consumer reporting agency 32 or other suitable database may store the customer's birth date. Because birth date is easily converted into the customer's present age by control unit 24 or by server farm 28, this description refers to "age" and "birth date" as synonymous). Alternatively, the credit card company database 34, if it contains the customer's age data, can be queried for both the age data and for credit verification. The received age information can then be stored, along with other customer information, e.g., the customer's credit card number, in the server farm 28. With this accomplished, it is unnecessary the next time a customer makes a purchase from the vending machine 10 (or any other vending machine in communication with the server farm 28) to verify the customer's age via the consumer reporting agency 32, as this information has previously been stored in server farm 28 and can be easily queried by the vending machine 10, using the customer information, to see if a match exists. This saves the vending machine operator money as it usually costs every time that the consumer reporting agency 32 is queried.

Figure 1B:
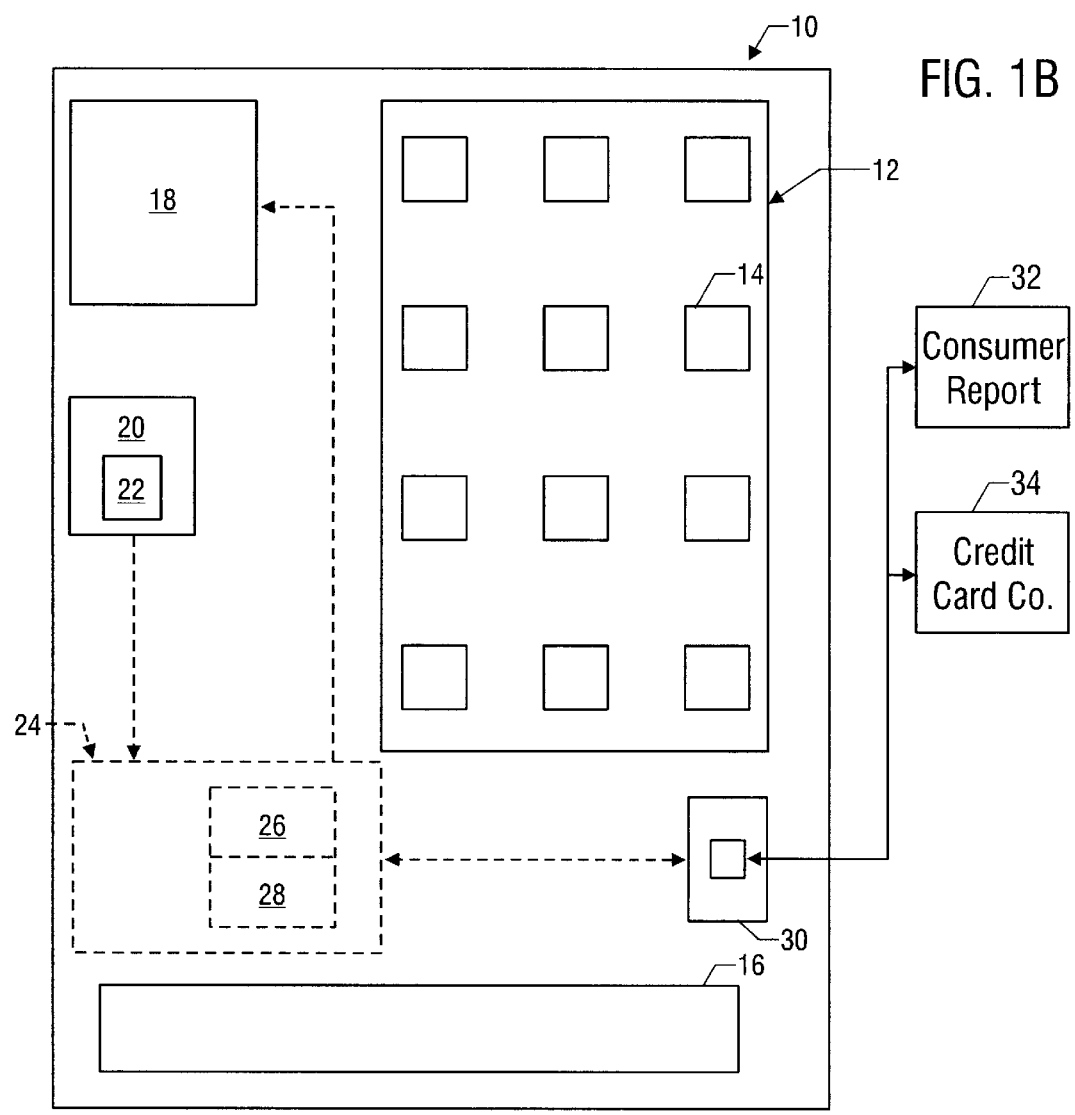
FIG. 1B is a block diagram illustrating an alternative embodiment of the vending machine of FIG. 1A.

It is important to note that FIG. 1A only constitutes one embodiment of the vending machine and that many modification are possible. For example, server farm 28 may reside inside a given vending machine 10, as shown in FIG. 1B. However, this configuration requires each vending machine to have its own server farm 28, which may be unduly expensive in a given application. Moreover, this alternative configuration might limit the information stored on a given vending machine to only those customers that have used that particular vending machine, or may make it more difficult for a network of vending machines to share customer information, which may be undesirable in a given application. Furthermore, card reader 22 is not strictly necessary if it is contemplated that a customer will type customer information into the vending machine 10 via a key pad instead of "swiping" it through a card reader. Moreover, separate memory devices may be associated with control unit 24 for the purpose of temporarily storing information relevant to a particular purchase, such as age information and the customer information, including, preferably, a credit card number. In short, one skilled in the art will recognize that vending machine 10 may be modified in numerous ways, but still be within the scope of the inventive aspects disclosed herein.

Figure 2:
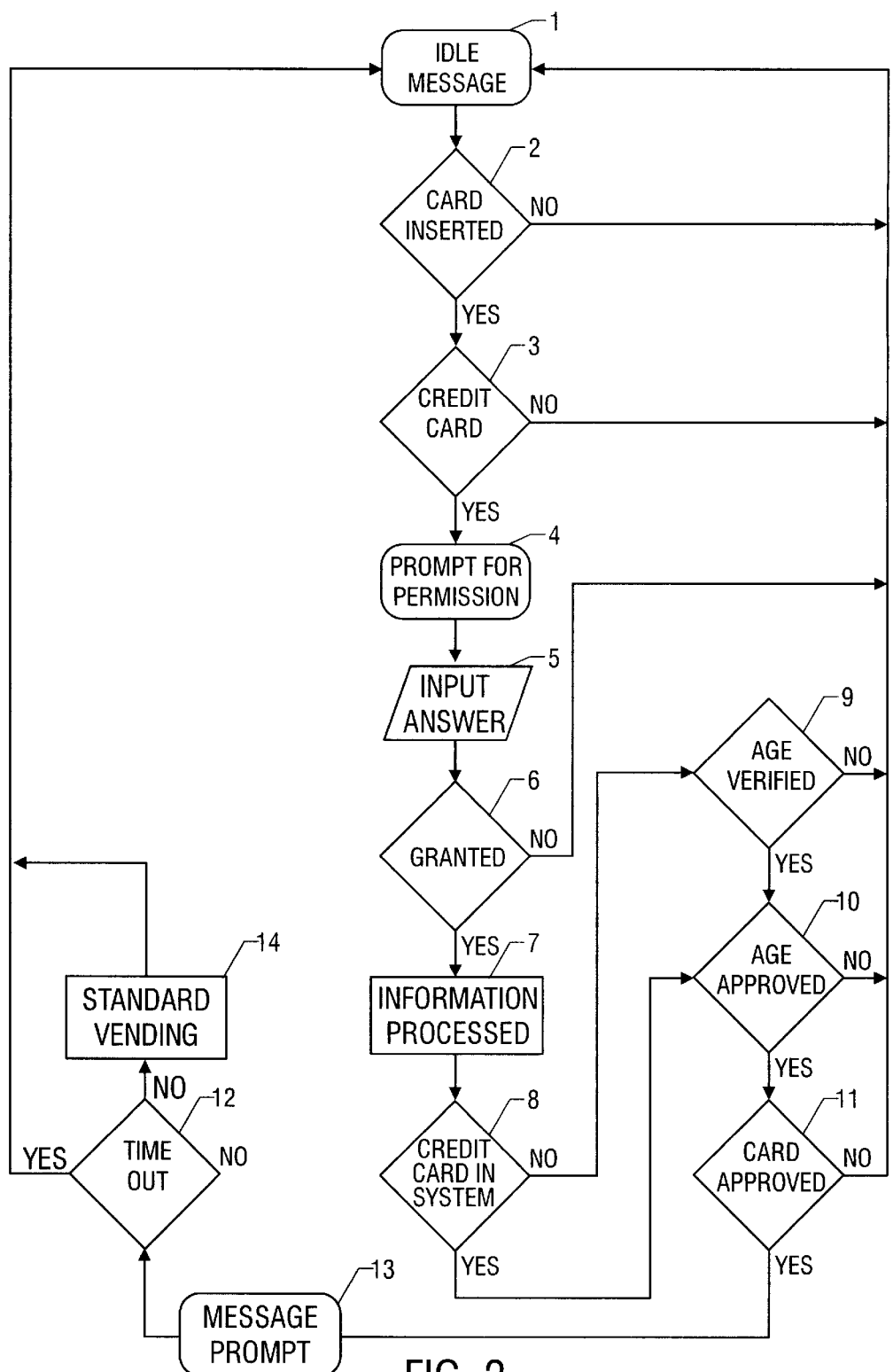
FIG. 2 is an exemplary flow diagram illustrating operation of the vending machine of FIG. 1.

FIG. 2 shows an exemplary flow diagram illustrating the operation of the disclosed vending machine 10. In this example, it is assumed that the customer will use a traditional credit card containing a magnetic strip to pay for the purchase, and to allow his age and credit to be verified. It is also assumed that the server farm 28 resides outside of the vending machine 10. However, one skilled in the art will recognize that the basic aspects of the flow diagram will be similar when used in conjunctions with other embodiments of the invention, or will require only minor and logical modifications.

Beginning at step 1, vending machine 10 prompts the customer by an "idle message" on display 18 to enter customer information, i.e., to insert, "swipe," or otherwise enter data from his credit card into input device 20 (and/or credit card reader 22). In another embodiment, input device 20 includes a keypad for manually entering customer information, but, as previously mentioned, this is not necessary if the credit card is only to be read by the card reader 22.

Proceeding to step 2, control unit 24 determines if a card has been inserted into the reader 22, and then, at step 3, identifies the inserted card as being a credit card. At this point, the customer information, in this example the credit card number, is stored in the control unit 24. At step 4, display 18 prompts the reader to grant or deny access to personal credit information in order to verify the customer's age using consumer reporting agency 32 and/or to verify the availability of credit from credit card company 34. At step 4, it may also be necessary for the customer to input "additional information," such as a name, phone number, social security number, birth date, address, a password or code. This additional information may be necessary if the third party databases 32 and 34 require more that just the customer information (e.g., the credit card number) to provide access to desired age and/or credit information.

At step 5, the customer grants the necessary permission (and, if necessary, provides "additional information"), for example, by pressing appropriate keys on the keypad of the input device 22. If the customer grants permission at step 6, control unit 24 proceeds to step 7, and transmits the customer information (and, if necessary, the additional information) to server farm 28 via modem 30 to be permanently stored and/or processed. On the other hand, if the customer declines to grant permission, control unit 24 terminates the transaction.

At step 8, control unit 24 queries server farm 28 to see if the entered customer information has been previously processed and stored during a previous transaction. This is most easily and preferably accomplished by the server farm 28 by scanning its database to see if the customer information (e.g., the credit card number) appears therein. If the customer information has not been so processed, server farm 28 communicates with consumer reporting agency 32 or other suitable database to verify the customer's age at step 9. This age information is then stored along with the customer information (and any other pertinent information, such as additional information, other information from the credit card, and other information from the database 32) in server farm 28. As previously discussed, the previous storage of age information in server farm 28 facilitates the age verification process, as it is unnecessary for server farm 28 to query consumer report database 32. Thus, if the server farm concludes that the customer information has been previously processed, the customer's age is simply pulled from server farm 28. On the basis of the retrieved age, whether from the server farm 28 or database 32, control unit 24 either approves or declines the transaction at step 10.

Once the customer's age has been verified, at step 11, server farm 28 sends the customer information (and if necessary, additional information) to credit card company database 34 to verify that the card is valid, contains suitable credit, and to approve the credit transaction. If the credit card is denied, the transaction is terminated, just as if the age were not verified at step 9. (Alternatively, if the credit card company database 34 contains customer age information, it may also be retrieved at step 11, and step 9 may be skipped). During steps 8–11, it is preferred that display 18 display a message such as "processing" to let the customer know what is happening, and to inform the customer to wait while the necessary verifications are completed.

If both the age of the customer is verified as being acceptable to purchase the age restricted products 14, and the credit card is approved, vending machine 10 is enabled to complete the transaction and the customer is prompted at step 13 by display 18 to make his or her selection. In a preferred embodiment, the control unit 24 includes a timer for timing a time-out period at step 12. Upon expiration of the time-out period, i.e., if the customer does not complete the transaction in a timely fashion after verification, the system reverts to the idle message at step 1. Assuming a timely transaction, the selection of a particular product 14 is made at input device 20, which may have separate keys corresponding to products 14 as is typical in a conventional vending machine. Thereafter, the age-restricted product 14 is vended as in a traditional vending machine, and may be retrieved by the customer from product dispensing door 16.

As one skilled in the art will recognize, many variations on the process described above and summarized in FIG. 2 may be realized. For example, in a preferred embodiment, age verification (step 9) and credit approval (step 11) occur simultaneously, although the queried results from databases 32 and 34 may not arrive back at the server farm 28 or vending machine 10 at the same time. It may also be unnecessary in a given application to verify credit via database 34, although this seems imprudent, especially given that the credit card number is already preferably being used for purposes of age verification. Moreover, while it is contemplated that the price of the purchase will be billed to the customer via the connection with credit card company database 34, this is not strictly necessary, and instead cash could be input into the vending machine after age verification. Indeed, the customer may be provided the option to either pay by cash or by credit card, value added card, "smart cards," etc. Additionally, the use of server farm 28 to store information on the customer is not strictly necessary, although such an approach is presently preferred to reduce the number of calls that need to be made to the consumer reporting agency database 32 to verify customer age.

In an alternative embodiment, the customer impliedly consents to the age verification or credit verification process by inserting his or her credit card in the credit card reader 22, thus mooting permission step 4 of FIG. 2. (However, this will not necessarily moot the need to acquire additional information if such is needed by the third party databases 32 and/or 34). In this circumstance, it is contemplated that the display 18 or other text on vending machine 10 will notify the customer that such verifications will be made.

Figure 3A:
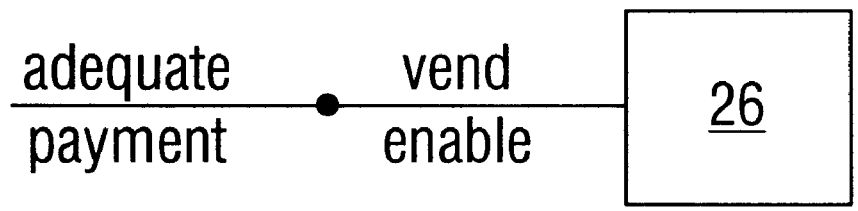
FIG. 3A is a schematic illustrating the prior art circuitry for enabling the purchase of a product.
Figure 3B:
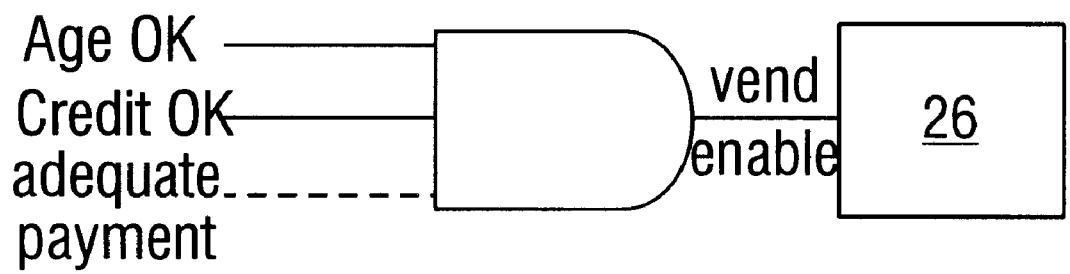
FIG. 3B is a schematic illustrating circuitry for enabling the purchase of an age-restricted product in accordance with the invention.

In the event that control unit 24 determines that a purchase is not appropriate, for example, because age verification cannot be accomplished or the customer's age is insufficient, or because the credit card has been rejected, the purchase will not be enabled. This is accomplished by sending a control signal (or signals) to the microprocessor 26 of control unit 24, as shown in FIG. 3B. In a traditional vending machine, shown in FIG. 3A, a signal is sent to microprocessor 26 to indicate whether "adequate payment" has been provided by the customer to make a purchase. If so, control unit 24, via microprocessor 26, enables the purchase through traditional means. In the preferred embodiment, the control unit 24 sends a "vend request" after verification of the customer's age and credit. Additionally, if separate provisions are made in the vending machine for payment other than by the credit card, an "adequate payment" signal may be ANDed with the "age OK" and "credit OK" signals, as shown in FIG. 3B. As one skilled in the art will recognize, the "age OK" signal may ultimately be generated by the server farm 28, or by the control unit 24 in conjunction with the information receives from the server farm 28.

From the foregoing detailed description of specific embodiments of the invention, it should be apparent that an improved method and apparatus for vending age-restricted products has been disclosed. Although specific embodiments of the invention have been disclosed in some detail, this has been done solely for the purposes of illustrating various aspects and features of the invention, and is not intended to be limiting with respect to the scope of the invention. One skilled in the art will immediately recognize upon reading this disclosure that several other modifications could be made to the disclosed method and apparatus that are consistent with the inventive nature of the disclosed subject matter. It is therefore contemplated that various substitutions, alterations, and/or modifications may be made to the disclosed embodiment without departing from the spirit and scope of the invention as defined in the appended claims.

What is claimed is:

1. A method of vending products from a vending machine, the method comprising:
    (a) inputting customer information into the vending machine;
    (b) sending the customer information to a first database to retrieve age information indicative of the customer's age;
    (c) determining, on the basis of the age information, whether a product in the vending machine can be vended to the customer; and
    (d) storing the customer information and the age information to an intermediate base in a server farm upon vending the product to the customer.

2. The method of claim 1, wherein the customer information is a credit card number.

3. The method of claim 1, wherein the customer information is contained on a card, and the card is a credit card.

4. The method of claim 1, wherein inputting the customer information constitutes the use of a key pad.

5. The method of claim 1, wherein inputting the customer information constitutes the use of a card reader.

6. The method of claim 1, wherein the first database is a third party database.

7. The method of claim 1, wherein the first database stores the age information upon vending a product to the customer.

8. The method of claim 7, wherein the first database is a server farm.

9. The method of claim 1, wherein the first database resides inside the vending machine.

10. The method of claim 9, wherein the first database stores the age information upon vending a product to the customer.

11. The method of claim 10, wherein the first database is a server farm.

12. The method of claim 1, further comprising sending the customer information to a second database to verify credit approval.

13. The method of claim 12, wherein step (c) further comprises determining on the basis of the credit approval, whether a product in the vending machine can be vended to the customer.

14. The method of claim 1, further comprising inputting additional information into the vending machine to enable the retrieval of the age information from the first database.

15. The method of claim 1, further comprising asking the customer permission to send the customer information to the first database.

16. The method of claim 1, further comprising paying for the vended product using the customer information.

17. The method of claim 1, further comprising the step of checking the first database to see if age information is present on the first database, and if such age information is not present, then sending the customer information to the server farm to retrieve the age information.

18. The method of claim 17, wherein the first database is a server farm.

19. The method of claim 17, wherein the server farm is a third party database.

20. The method of claim 1, further comprising paying for the vended product using cash.

* * * * *